US010107269B2

(12) United States Patent
Shome

(10) Patent No.: US 10,107,269 B2
(45) Date of Patent: Oct. 23, 2018

(54) MAGNETO-THERMAL CONVECTION ACTUATOR

(71) Applicant: The Boeing Company, Chicago, IL (US)

(72) Inventor: Moushumi Shome, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 355 days.

(21) Appl. No.: 15/006,187

(22) Filed: Jan. 26, 2016

(65) Prior Publication Data

US 2017/0211552 A1    Jul. 27, 2017

(51) Int. Cl.
*F03G 7/00* (2006.01)
*F03G 7/06* (2006.01)
*B64C 13/50* (2006.01)
*B64C 9/00* (2006.01)

(52) U.S. Cl.
CPC ............... *F03G 7/065* (2013.01); *B64C 9/00* (2013.01); *B64C 13/50* (2013.01)

(58) Field of Classification Search
CPC ............ F03G 7/065; B64C 9/00; B64C 13/50
See application file for complete search history.

(56) References Cited

U.S. PATENT DOCUMENTS

| 8,499,913 | B2 | 8/2013 | Gunter |
| 8,726,652 | B1 | 5/2014 | Gunter |
| 8,876,046 | B2 | 11/2014 | Gunter et al. |
| 9,120,554 | B2 | 9/2015 | Shome et al. |
| 9,145,198 | B1 | 9/2015 | Shome et al. |
| 2005/0073814 | A1* | 4/2005 | Tillotson ................. F28F 13/00 361/704 |
| 2016/0201654 | A1* | 7/2016 | Apdalhaliem .......... B64C 13/28 244/99.8 |

* cited by examiner

*Primary Examiner* — Ramon M Barrera
(74) *Attorney, Agent, or Firm* — MH2 Technology Law Group LLP

(57) ABSTRACT

An actuator includes a shape-memory alloy (SMA), a power supply that transmits electrical current, a heat source positioned proximate to the SMA, a heat sink positioned proximate to the SMA, and a control module. The control module causes the power supply to transmit the electrical current to the heat source in response to receiving a first signal, thereby causing the heat source to heat the SMA via induction heating. The control module also causes the power supply to cease transmitting the electrical current to the heat source in response to receiving a second signal, thereby causing the heat source to stop heating the SMA. The control module also causes the power supply to transmit the electrical current to the heat sink in response to receiving the second signal, thereby causing the heat sink to cool the SMA via magneto-thermal convection cooling.

20 Claims, 9 Drawing Sheets

MAGNETO-THERMAL CONVECTION ACTUATOR

TECHNICAL FIELD

The present teachings relate to the field of actuators and, more particularly, to systems and methods for actuating a movable component using a shape-memory alloy ("SMA").

BACKGROUND

Mobile units such as aircrafts, boats, and automobiles may include actuators. In some instances, the actuators are used to maintain or vary the trajectory of the mobile unit. For example, an actuator may be used to move a flap on a wing of an airplane. The actuators may be hydraulic and include a cylinder or fluid motor that uses hydraulic power to facilitate a mechanical operation (e.g., moving the flap). Hydraulic actuators may, however, be heavy, have limited acceleration, and have maintenance issues such as annunciated or latent failures. Annunciated failures may be recognized by hydraulic fluid on the ground or an anomaly message before or during a voyage. Latent failures may not be apparent during routine maintenance, and may not be discovered until a close inspection takes place.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

An actuator is disclosed. The actuator includes a shape-memory alloy (SMA), a power supply that transmits electrical current, a heat source positioned proximate to the SMA, a heat sink positioned proximate to the SMA, and a control module. The control module causes the power supply to transmit the electrical current to the heat source in response to receiving a first signal, thereby causing the heat source to heat the SMA via induction heating. The control module also causes the power supply to cease transmitting the electrical current to the heat source in response to receiving a second signal, thereby causing the heat source to stop heating the SMA. The control module also causes the power supply to transmit the electrical current to the heat sink in response to receiving the second signal, thereby causing the heat sink to cool the SMA via magneto-thermal convection cooling.

A mobile unit is also disclosed. The mobile unit includes a movable component and an actuator that actuates the movable component between a first position and a second position. The actuator includes a shape-memory alloy (SMA), a power supply that transmits electrical current, a heat source positioned proximate to the SMA, a heat sink positioned proximate to the SMA, and a control module. The control module causes the power supply to transmit the electrical current to the heat source in response to receiving a first signal, thereby causing the heat source to heat the SMA via induction heating. The SMA transforms from a first shape to a second shape when heated to above a predetermined temperature, and the movable component actuates from the first position into the second position in response to the SMA transforming from the first shape into the second shape. The control module also causes the power supply to cease transmitting the electrical current to the heat source in response to receiving a second signal, thereby causing the heat source to stop heating the SMA. The control module also causes the power supply to transmit the electrical current to the heat sink in response to receiving the second signal, thereby causing the heat sink to cool the SMA via magneto-thermal convection cooling. The SMA transforms from the second shape back to the first shape when cooled to below the predetermined temperature, and the movable component actuates from the second position into the first position in response to the SMA transforming from the second shape back into the first shape.

A method for actuating a movable component is also disclosed. The method includes supplying electrical current from a power supply to a heat source in response to receiving a first signal, thereby causing the heat source to heat a shape-memory alloy (SMA) via induction heating. The SMA transforms from a first shape into a second shape when heated to above a predetermined temperature, and the movable component actuates from a first position into a second position in response to the SMA transforming from the first shape into the second shape. The method then includes supplying the electrical current to a heat sink in response to receiving a second signal, thereby causing the heat sink to cool the SMA via magneto-thermal convection cooling. The SMA transforms from the second shape back into the first shape when cooled to below the predetermined temperature, and the movable component actuates from the second position into the first position in response to the SMA transforming from the second shape back into the first shape.

The features, functions, and advantages that have been discussed can be achieved independently in various implementations or may be combined in yet other implementations further details of which can be seen with reference to the following description and drawings.

BRIEF DESCRIPTION OF THE DRAWINGS

The accompanying drawings, which are incorporated in and constitute a part of this specification, illustrate the present teachings and together with the description, serve to explain the principles of the disclosure. In the figures.

It should be noted that some details of the Figures have been simplified and are drawn to facilitate understanding of the present teachings rather than to maintain strict structural accuracy, detail, and scale.

DETAILED DESCRIPTION

Reference will now be made in detail to examples of the present teachings which are illustrated in the accompanying drawings. Wherever possible, the same reference numbers will be used throughout the drawings to refer to the same or like parts.

Figure 1:
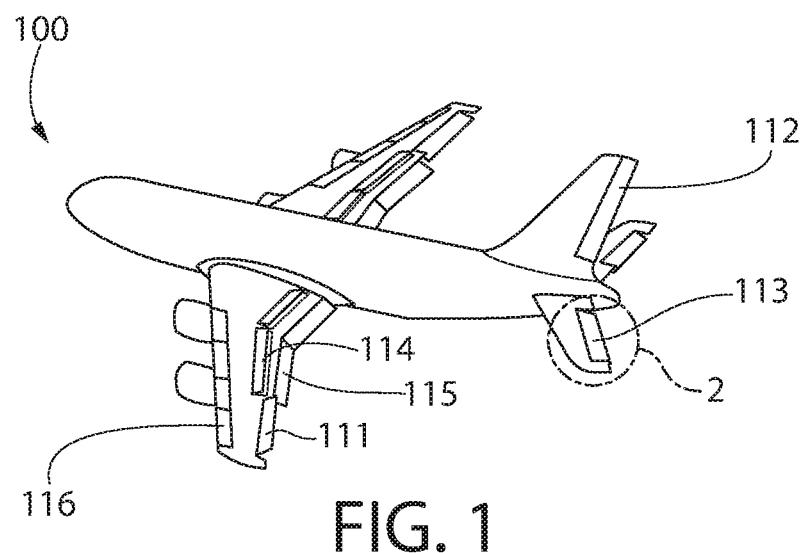
FIG. 1 depicts a perspective view of a mobile unit, according to an embodiment.

FIG. 1 depicts a perspective view of a mobile unit 100, according to an embodiment. As shown, the mobile unit 100 may be an aircraft, such as an airplane, a helicopter, or an unmanned aerial vehicle. In other embodiments, the mobile unit 100 may be a boat, an automobile, or the like. In yet other embodiments, the unit 100 may not be mobile; rather, it may be stationary.

The mobile unit 100 may include one or more movable components. As shown in FIG. 1, the movable components may be or include an aileron 111, a rudder 112, an elevator 113, a spoiler 114, a flap 115, a slat 116, or a combination thereof. Although six movable components are shown, it will be appreciated that these movable components are merely illustrative, and additional and/or different movable components are also contemplated herein, depending at least partially upon the type of mobile unit 100.

Figure 2:
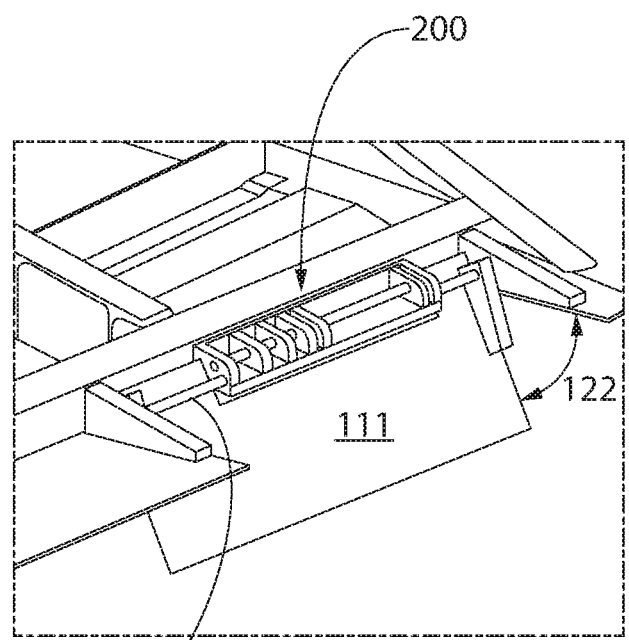
FIG. 2 depicts an enlarged view of a portion of the mobile unit showing a movable component (e.g., an aileron) and an actuator configured to move the movable component, according to an embodiment.

FIG. 2 depicts an enlarged view of a portion of the mobile unit 100 showing a movable component (e.g., the aileron 111) and an actuator 200 configured to move the movable component 111, according to an embodiment. In response to a signal received from a user, the actuator 200 may be configured to cause the movable component (e.g., the aileron 111) to move between at least two positions. In this embodiment, the movable component (e.g., the aileron 111) may rotate about a shaft 120 through an arc 122.

Figure 3:
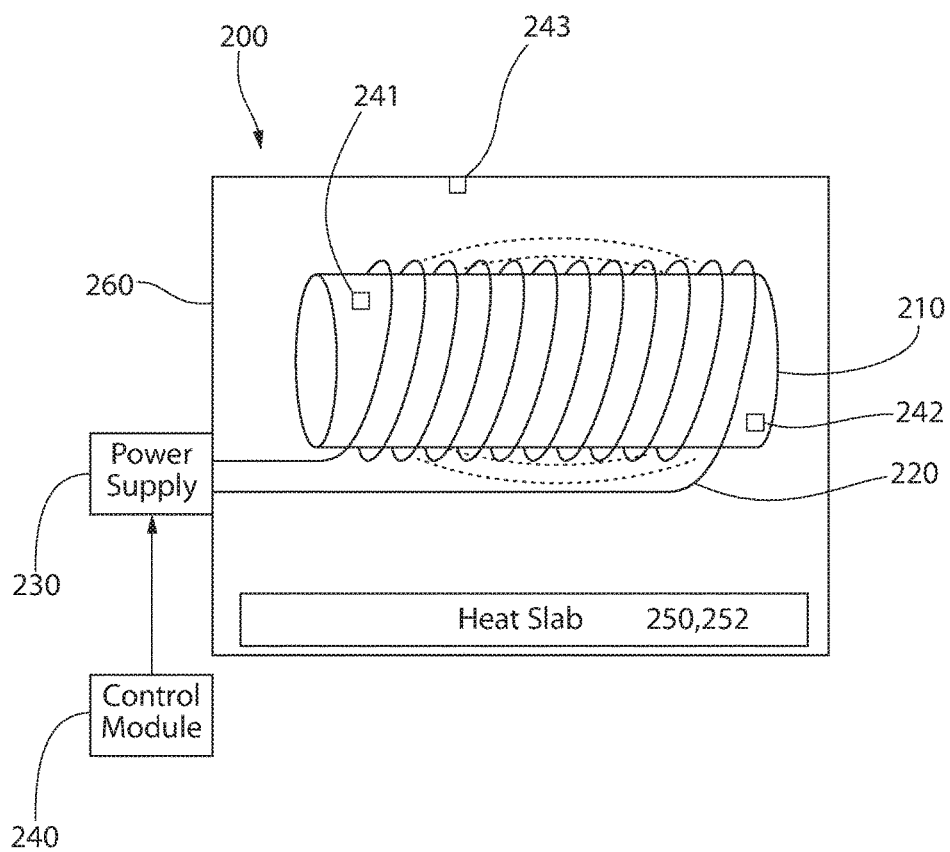
FIG. 3 depicts a schematic view of an actuator including a shape-memory alloy ("SMA") in a first shape, according to an embodiment.

FIG. 3 depicts a schematic view of the actuator 200 including a shape-memory alloy ("SMA") 210 in a first (e.g., initial) shape, according to an embodiment. As shown, the SMA 210 may be substantially cylindrical (e.g., a tube); however, other shapes may also be used. As described in more detail below, the SMA 210 may change shapes when it is heated to above and/or cooled to below a predetermined temperature (e.g., 360° F.), which may depend at least partially upon the material(s) that make up the SMA 210. The SMA 210 may be or include zinc, copper, gold, iron, aluminum, nickel, titanium, manganese, silicon, or a combination thereof. For example, the SMA 210 may be a copper-aluminum-nickel alloy or a nickel-titanium alloy.

The actuator 200 may also include a heat source 220 positioned proximate to the SMA 210. As shown, the heat source 220 may be a coil that is wrapped helically around the SMA 210. The heat source 220 may be in contact with the SMA 210. In another embodiment, a small gap may be present between the heat source 220 and the SMA 210, and the gap may be from about 1 mm to about 10 mm. When supplied with an electrical current, the heat source 220 generates an electromagnetic field around the SMA 210 that heats the SMA 210 via induction heating.

The actuator 200 may also include a power supply 230 that is coupled to the heat source 220. The power supply 230 may be configured to supply an electrical current (e.g., an AC current) to the heat source 220, which may cause the heat source 220 to heat the SMA 210. The power supply 230 may also supply the electrical current to a heat sink 250, which is described in greater detail below.

The actuator 200 may also include a control module 240 that is coupled to the power supply 230. The control module 240 may be configured to maintain or vary the amount of current supplied by the power supply 230 to the heat source 220 and/or the heat sink 250 to control the temperature of the SMA 210. In one embodiment, the heat source (e.g., coil) 220 may be configured to measure the temperature of the heat source 220 and/or the SMA 210 and to transmit the measured temperature to the control module 240. In another embodiment, one or more temperature sensors (three are shown: 241-243) may be coupled (or positioned proximate) to the SMA 210. The temperature sensors 241-243 may be thermocouples that are configured to measure the temperature of the SMA 210 and to transmit the temperature of the SMA 210 to the control module 240. The control module 240 may then maintain or vary the amount of current supplied by the power supply 230 to the heat source 220 and/or the heat sink 250 in response to the measured temperature. Multiple temperature sensors 241-243 may be used to measure the temperature at multiple locations on and/or around the SMA 210. This may allow the control module 240 to heat and/or cool the SMA 210 substantially uniformly. In another embodiment, the control module 240 may be divided into two portions: one for monitoring and controlling the magnetic field and the other for monitoring and controlling the thermal field.

The actuator 200 may also include a heat sink 250 positioned proximate to the SMA 210. The heat sink 250 may be configured to cool the SMA 210. For example, the heat sink 250 may receive the electrical current from the power supply 230, which may allow the heat sink 250 to cool the SMA 210 using magneto-thermal convection. A distance between the SMA 210 and the heat sink 250 may be from about 5 cm to about 10 cm.

Figure 6:
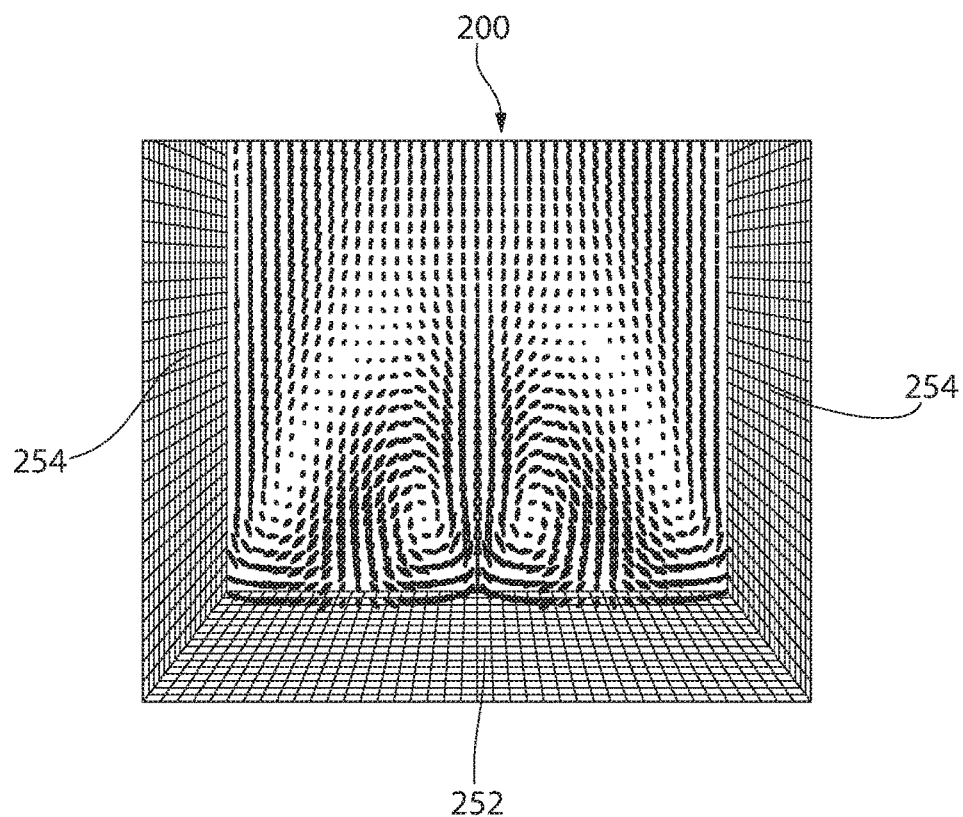
FIG. 6 depicts velocity vectors of the actuator, according to an embodiment.
Figure 7:
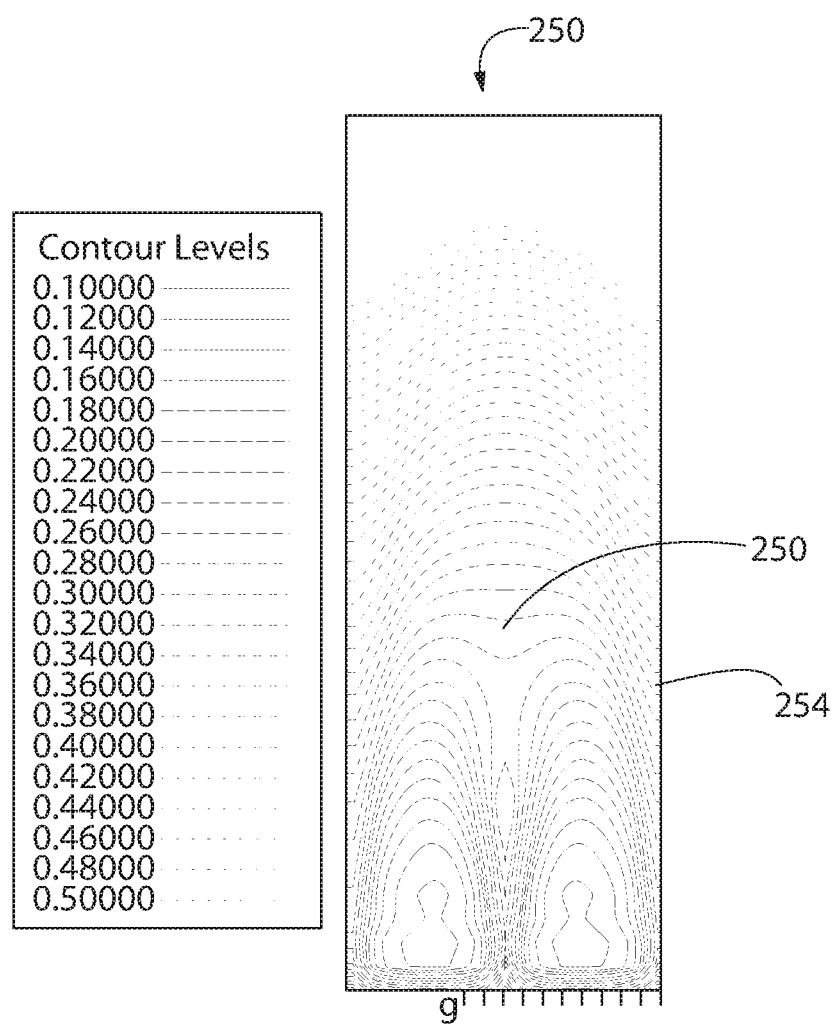
FIG. 7 depicts the contours of temperature of a heat sink in the actuator, according to an embodiment.

In one embodiment, the heat sink 250 may include a slab 252 and a plurality of cooling fins 254 (shown in FIGS. 6 and 7). The slab 252 may be made from a metal having a high thermal conductivity, such as copper. A magnetic axis may extend below the cooling fins 254. The heat flux at the heat sink 250 may be from about 1000 W/m$^2$ to about 5000 W/m$^2$. For example, the heat flux may be about 3125 W/m$^2$. In another embodiment, the heat sink 250 may include a laser that is configured to cool the SMA 210 by trapping ions. More particularly, the trapped cooled ions within the magnetic field may capture heat energy from the SMA 210, causing the SMA 210 to cool down and return to its first (e.g., initial) shape.

The actuator 200 may also include an adiabatic chamber 260. The SMA 210, the heat source 220, and the heat sink 250 may be positioned within the adiabatic chamber 260. The adiabatic chamber 260 may prevent the external (e.g., ambient) temperature from affecting heating and cooling of the SMA 210. The adiabatic chamber 260 may include walls made from insulating materials.

Figure 4:
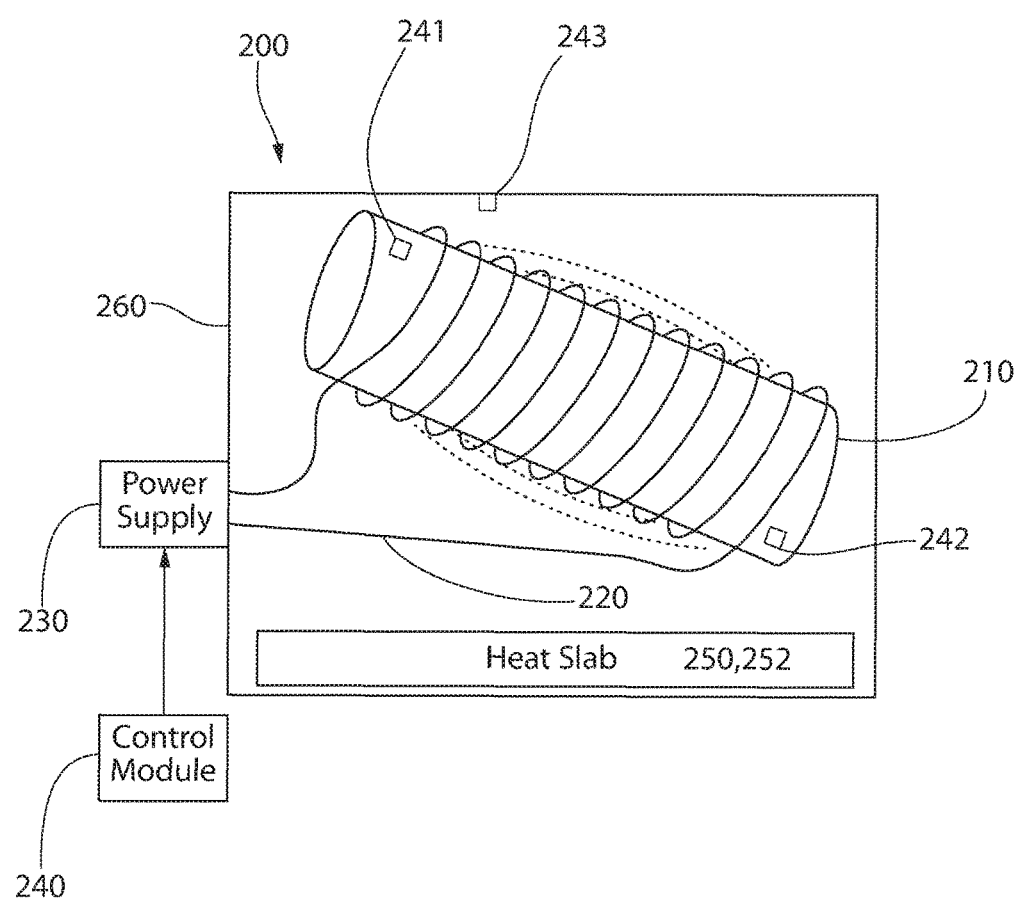
FIG. 4 depicts a schematic view of the actuator with the SMA in a second shape, according to an embodiment.

FIG. 4 depicts a schematic view of the actuator 200 with the SMA 210 in a second, shape, according to an embodiment. In at least one embodiment, the SMA 210 may have the first shape (FIG. 3) when the SMA 210 is below a predetermined temperature, and the SMA 210 may transform into the second shape (FIG. 4) when the SMA 210 is heated to above the predetermined temperature. In another embodiment, the SMA 210 may have the first shape (FIG. 3) when the SMA 210 is above the predetermined temperature, and the SMA 210 may transform into the second shape (FIG.

4) when the SMA 210 is cooled to below the predetermined temperature. The predetermined temperature may be from about 300° F. to about 500° F., depending at least partially upon the material(s) of the SMA 210. In response to the SMA 210 changing shape, the movable component 111-116 may move while maintaining a high stiffness to resist loading, such as aero-elastic loads and structural loads.

The SMA 210 may be a one-way SMA or a two-way SMA. A one-way SMA may be in the first (e.g., initial) shape when it is below the predetermined temperature. When below the predetermined temperature, the one-way SMA may be bent or stretched into a second shape and hold the second shape. When the one-way SMA is heated to above the predetermined temperature, the one-way SMA may return to its first shape and may remain in the first shape after the one-way SMA cools. The one-way SMA may then be bent or stretched into the second shape, and the process may be repeated.

A two-way SMA may have a first shape when below the predetermined temperature and a second shape when above the predetermined temperature. For example, the two-way SMA may initially be below the predetermined temperature and have the first shape. When heated to above the predetermined temperature, the two-way SMA may transform into the second shape. Then, when the temperature drops below the predetermined temperature, the two-way SMA may transform back into the first shape.

Figure 5:
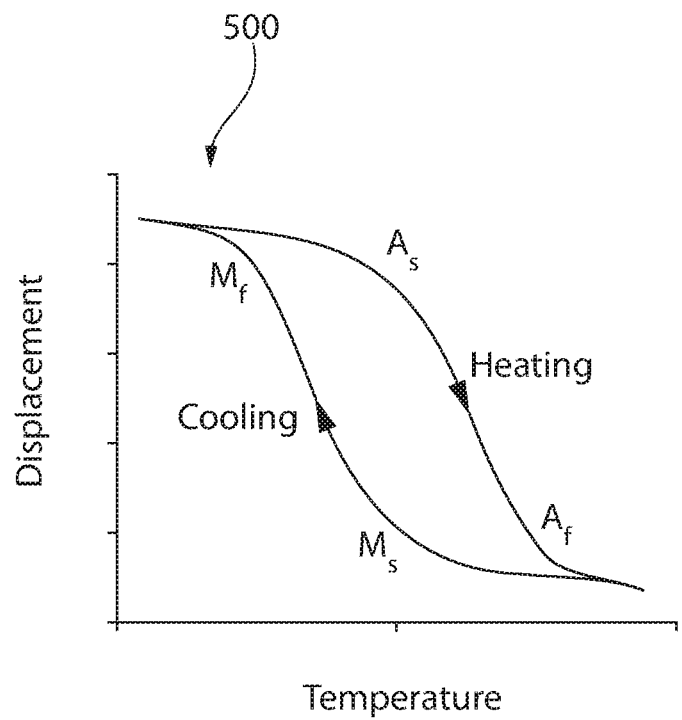
FIG. 5 depicts a graph showing the heating and cooling phases of the SMA in the actuator, according to an embodiment.

FIG. 5 depicts a graph 500 showing the heating and cooling phases of the SMA 210 in the actuator 200, according to an embodiment. The graph 500 shows the start of the austenite state ($A_s$), the finish of the austenite state ($A_f$), the start of the martensitic state ($M_s$), and the finish of the martensitic state ($M_f$). In the austenite state, the SMA 210 is heated and transforms from the first shape (FIG. 3) to the second shape (FIG. 4). In the martensitic state, the SMA 210 cools and transforms from the second shape (FIG. 4) back into the first shape (FIG. 3).

FIG. 6 depicts velocity vectors surrounding the SMA 210, according to an embodiment. The slab 252 of the heat sink 250 is shown at the bottom FIG. 6, and the fins 254 of the heat sink 250 are shown at the left and right of FIG. 6.

FIG. 7 depicts contours of temperature of the heat sink 250 where heat transfer is the inverse of temperature, according to an embodiment. In FIG. 7, the slab 252 of the heat sink 250 is in the middle, and the fins 254 are on the left and the right.

Figure 8:
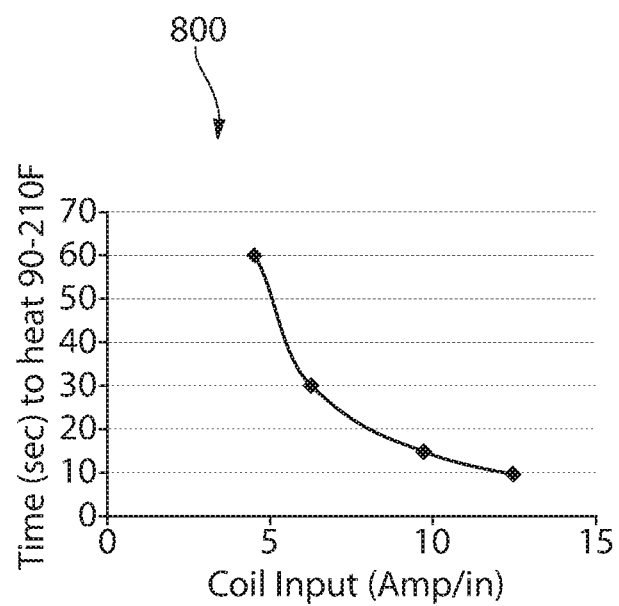
FIG. 8 depicts a graph showing the time to heat the SMA versus current, according to an embodiment.

FIG. 8 depicts a graph 800 showing heating time for the SMA 210 versus current, according to an embodiment. More particularly, the graph 800 shows the time that it takes the temperature of the SMA 210 to increase from 90° F. to 210° F. and to decrease back to 90° F. at different levels of electrical current. In this example, the length of the heat source (e.g., coil) 220 is about 4 inches. Thus, looking at the graph 800, it may take about 60 seconds for the temperature of the SMA 210 to go from 90° F. to 210° F. and back to 90° F. when 18 amps are supplied to the heat source (e.g., coil) 220. The time drops to about 10 seconds when 50 amps are supplied.

Figure 9:
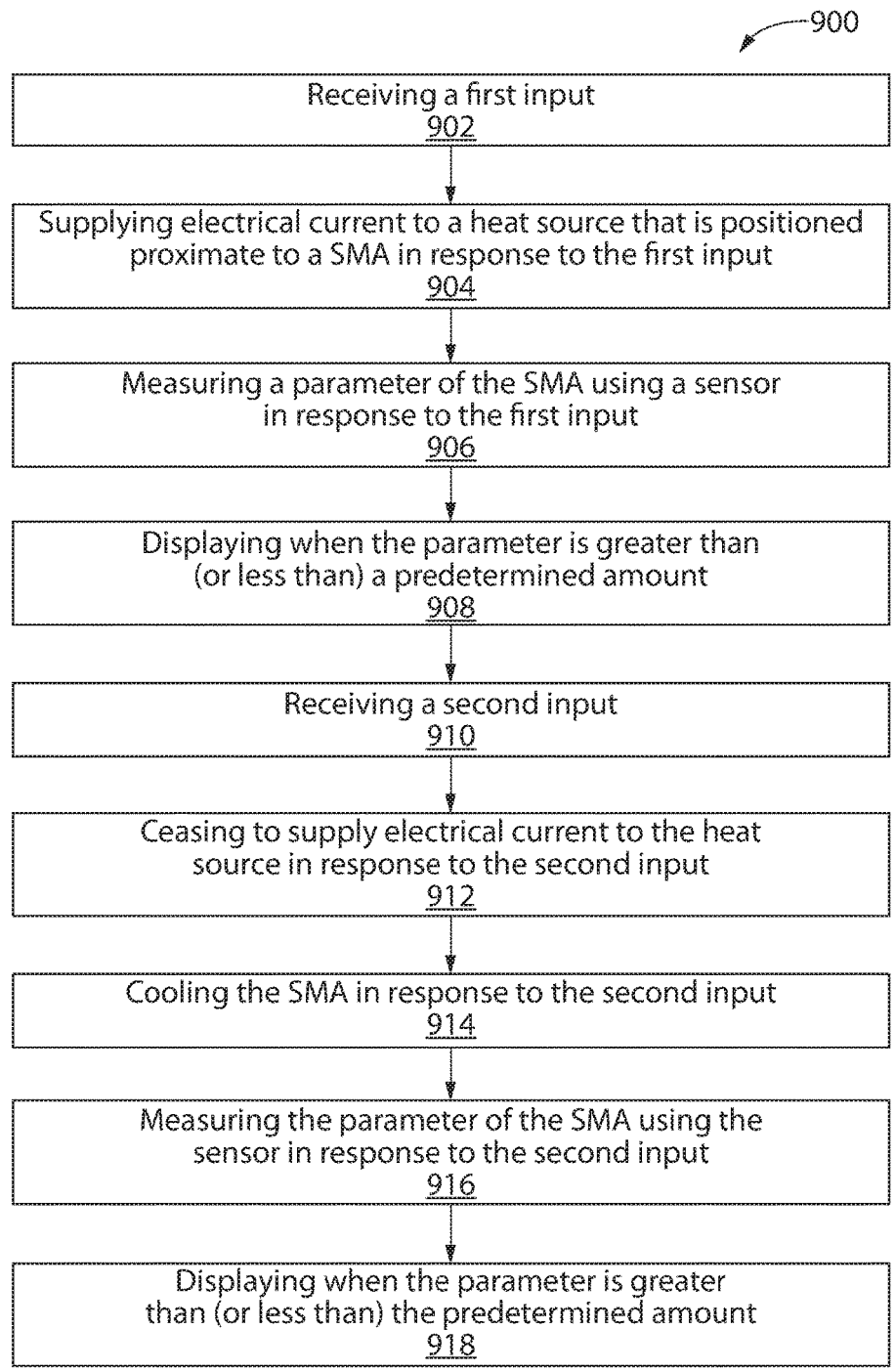
FIG. 9 depicts a flowchart of a method for actuating a movable component, according to an embodiment.

FIG. 9 depicts a flowchart of a method 900 for actuating a movable component 111-116, according to an embodiment. The method 900 may include receiving a first input from a user, as at 902. The first input may be received by the control module 240 in the actuator 200. The first input may be or include the user turning a (e.g., steering) wheel, flipping a switch, pushing a button, moving a lever, or the like.

In response to receiving the first input, the control module 240 may cause the power supply 230 to supply electrical current to the heat source 220 that is positioned proximate to the SMA 210, as at 904. The electrical current may generate an electromagnetic field around the SMA 210 that heats the SMA 210 via induction heating. The SMA 210 may be heated to a predetermined temperature in from about 6 seconds to about 10 seconds. When the SMA 210 exceeds the predetermined temperature, the SMA 210 may transform from the first shape (see, e.g., FIG. 3) to the second shape (see, e.g., FIG. 4). The movable component 111-116 may actuate from the first position to the second position in response to the SMA 210 transforming into the second shape. For example, when the SMA 210 is in the first shape, the movable component (e.g., the rudder) 112 of the mobile unit (e.g., the airplane) 100 may be in a central position that causes the mobile unit 100 to fly straight. When the SMA 210 transforms into the second shape, this may exert a force on the movable component 112 that causes the movable component 112 to move (e.g., to the left), which causes the mobile unit 100 to turn (e.g., to the left).

The method 900 may also include measuring a parameter of the SMA 210 using one or more sensors 241-243 after the first signal is received, as at 906. The parameter may be measured continuously or at discrete time intervals (e.g., one measurement per second) after the first signal is received. For example, the parameter may be measured both before and after the SMA 210 transforms from the first shape to the second shape. The parameter measured by the sensors 241-243 may be transmitted back to the control module 240 for processing.

In one embodiment, the parameter may be temperature. More particularly, the sensors 241-243 may be temperature sensors that are coupled to the SMA 210 or positioned proximate to (e.g., less than or equal to 5 cm from) the SMA 210. Alternatively, the sensors 241-243 may be part of the heat source 220 that is configured to heat the SMA 210. When multiple sensors 241-243 are used, the temperature may be measured at various locations on and/or around the SMA 210. In another embodiment, parameter may the distance between the sensors 241-243 and the SMA 210. For example, the sensors 241-243 may detect when the SMA contacts the sensors 241-243. In another example, the sensors 241-243 may detect when the distance between the SMA 210 and the sensors 241-243 becomes less than or greater than a predetermined amount (e.g., 2 cm).

The method 900 may also include displaying to the user when the parameter measured at 906 is greater than (or less than) a predetermined amount, as at 908. This may include transmitting a signal from the control module 240 to a device proximate to the user. The device may be a display screen, an indicator that lights up, a speaker that makes an audible noise, or the like. Displaying when the parameter exceeds the predetermined amount may indicate that the movable component 111-116 has been actuated from the first position into the second position.

The method 900 may also include receiving a second input from the user, as at 910. The second input may be received by the control module 240 in the actuator 200. The second input may be received after the first input is received (e.g., at 202) and/or after the parameter is displayed to the user (e.g., at 908). For example, the second input may be in response to the parameter displayed to the user (e.g., at 908).

In response to receiving the second input, the control module 240 may cause the power supply 230 to cease supplying electrical current to the heat source 220, as at 912. As a result, the heat source 220 may stop generating the electromagnetic field around the SMA 210 that heats the SMA 210 via induction heating. This may allow the SMA 210 to begin cooling. In addition, in response to receiving the second input, the control module 240 may also cause the heat sink 250 to begin cooling the SMA 210, as at 914. More particularly, the control module 240 may cause the power supply 230 to supply electrical current to the heat sink 250, which causes the heat sink 250 to cool the SMA 210 via magneto-thermal convection cooling. The SMA 210 may be cooled to below the predetermined temperature in from about 4 seconds to about 8 seconds. In one example, the control module 240 may activate the heat slab 252 and/or the cooling fins 254. In another example, the control module 240 may activate the laser.

The method 900 may also include measuring the parameter of the SMA 210 using the one or more sensors 241-243 after the second signal is received, as at 916. The parameter may be the same as the parameter measured above at 906. The method 900 may also include displaying to the user when the parameter measured at 916 is less than (or greater than) the predetermined amount, as at 918. This may include transmitting a signal from the control module 240 to a device proximate to the user. The device may be a display screen, an indicator that lights up, a speaker that makes an audible noise, or the like. Displaying when the parameter has fallen below the predetermined amount may indicate that the movable component 111-116 has been actuated from the second position back into the first position.

Figure 10:
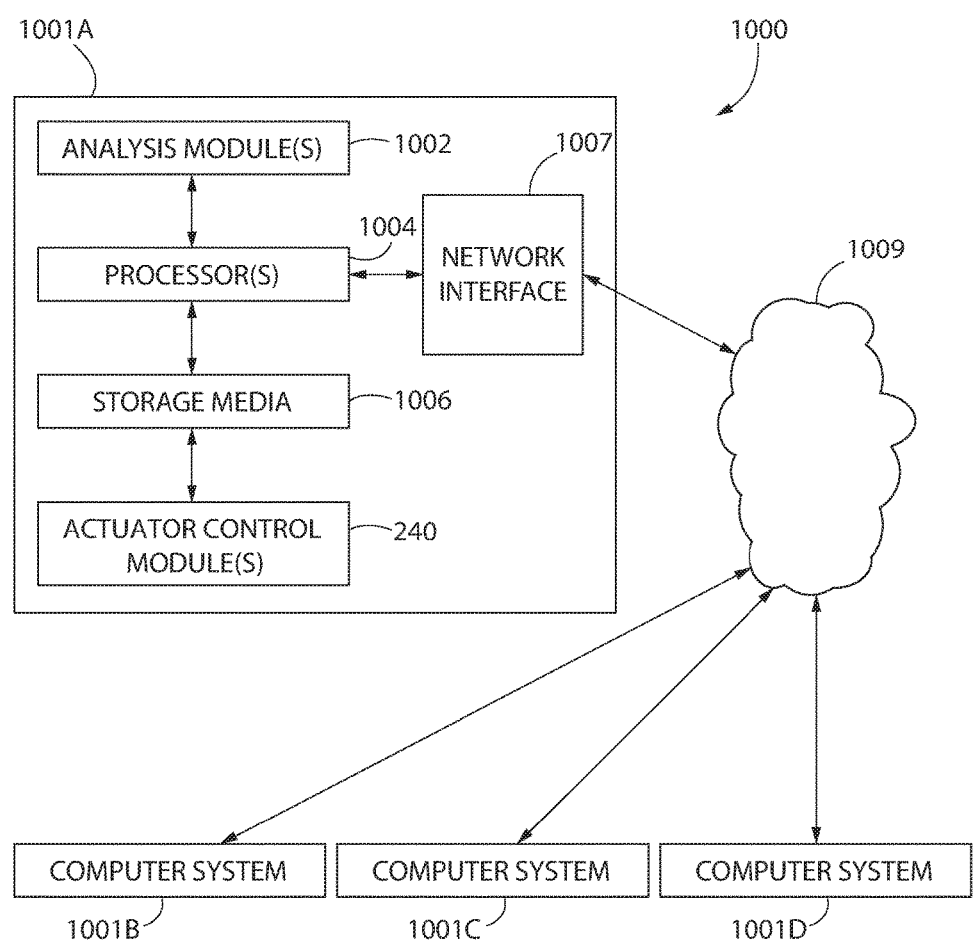
FIG. 10 depicts a schematic view of a computing system for performing at least a portion of the method, according to an embodiment.

FIG. 10 depicts a schematic view of a computing system 1000 for performing at least a portion of the method 900, according to an embodiment. The computing system 1000 may include a computer or computer system 1001A, which may be an individual computer system 1001A or an arrangement of distributed computer systems. The computer system 1001A includes one or more analysis modules 1002 that are configured to perform various tasks according to some embodiments, such as one or more methods disclosed herein. To perform these various tasks, the analysis module 1002 executes independently, or in coordination with, one or more processors 1004, which is (or are) connected to one or more storage media 1006. The processor(s) 1004 is (or are) also connected to a network interface 1007 to allow the computer system 1001A to communicate over a data network 1009 with one or more additional computer systems and/or computing systems, such as 1001B, 1001C, and/or 1001D (note that computer systems 1001B, 1001C and/or 1001D may or may not share the same architecture as computer system 1001A, and may be located in different physical locations, e.g., computer systems 1001A and 1001B may be located in a processing facility, while in communication with one or more computer systems such as 1001C and/or 1001D that are located in one or more data centers, and/or located in varying countries on different continents).

A processor may include a microprocessor, microcontroller, processor module or subsystem, programmable integrated circuit, programmable gate array, or another control or computing device.

The storage media 1006 may be implemented as one or more computer-readable or machine-readable storage media. Note that while in the example embodiment of FIG. 10 storage media 1006 is depicted as within computer system 1001A, in some embodiments, storage media 1006 may be distributed within and/or across multiple internal and/or external enclosures of computing system 1001A and/or additional computing systems. Storage media 1006 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURRY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 1000 contains one or more actuator control module(s) 240. As described above, the actuator control module 240 may receive information related to the temperature of and/or around the SMA 210, or receive information related to the distance between the SMA 210 and one or more sensors 241-243. In response to this information, the actuator control module 240 may cause the power supply 230 to begin, continue, or cease supplying electrical current to the heat source 220.

It should be appreciated that computing system 1000 is only one example of a computing system, and that computing system 1000 may have more or fewer components than shown, may combine additional components not depicted in the example embodiment of FIG. 10, and/or computing system 1000 may have a different configuration or arrangement of the components depicted in FIG. 10. The various components shown in FIG. 10 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. It will be appreciated that structural components and/or processing stages can be added or existing structural components and/or processing stages can be removed or modified. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the present teachings. Finally, "exemplary" indicates the description is used as an example, rather than implying that it is an ideal. The present disclosure provides specific implementations without being exhaustive, and other implementations of the present teachings may be apparent to those skilled in the art from consideration of the specification and practice of the disclosure herein. It is intended that the specification and examples be considered as exemplary only, with a true scope and spirit of the present teachings being indicated by the following claims.

The invention claimed is:

1. An actuator, comprising:
   a shape-memory alloy (SMA);
   a power supply configured to transmit electrical current;
   a heat source positioned proximate to the SMA;
   a heat sink positioned proximate to the SMA;
   a sensor coupled to the SMA or positioned proximate to the SMA, wherein the sensor is configured to measure a distance between the sensor and the SMA; and
   a control module configured to cause the power supply to:
      transmit the electrical current to the heat source in response to receiving a first signal, thereby causing the heat source to heat the SMA via induction heating;
      cease transmitting the electrical current to the heat source in response to receiving a second signal, thereby causing the heat source to stop heating the SMA, wherein the second signal is received after the distance is measured to be less than or greater than a predetermined amount; and
      transmit the electrical current to the heat sink in response to receiving the second signal, thereby causing the heat sink to cool the SMA via magneto-thermal convection cooling.

2. The actuator of claim 1, wherein the SMA has a first shape when the first signal is received, and wherein the SMA transforms into a second, different shape when the SMA is heated to above a predetermined temperature.

3. The actuator of claim 2, wherein the SMA has the second shape when the second signal is received, and wherein the SMA transforms back into the first shape when the SMA is cooled to below the predetermined temperature.

4. The actuator of claim 3, wherein the SMA causes a movable component on a mobile unit to actuate from a first position to a second position when the SMA transforms from the first shape into the second shape.

5. The actuator of claim 4, wherein the movable component is selected from the group consisting of an aileron, a rudder, an elevator, a spoiler, a flap, and a slap, and wherein the mobile unit is an aircraft.

6. The actuator of claim 1, wherein the heat source comprises a coil that is wrapped helically around the SMA.

7. The actuator of claim 1, wherein the heat sink comprises a metallic slab that is configured to capture heat energy using ion cooling.

8. The actuator of claim 1, further comprising an adiabatic chamber, wherein the SMA, the heat source, and the heat sink are positioned within the adiabatic chamber.

9. The actuator of claim 1, wherein the second signal is received in response to the distance becoming less than the predetermined amount.

10. The actuator of claim 1, wherein the second signal is received in response to the distance being zero such that the SMA contacts the sensor.

11. The actuator of claim 1, wherein the heat sink comprises a laser that cools the SMA by trapping ions.

12. A mobile unit, comprising:
    a movable component; and
    an actuator configured to actuate the movable component between a first position and a second position, the actuator comprising:
       a shape-memory alloy (SMA);
       a power supply configured to transmit electrical current;
       a heat source positioned proximate to the SMA;
       a heat sink positioned proximate to the SMA;
       a sensor coupled to the SMA or positioned proximate to the SMA, wherein the sensor is configured to measure a distance between the sensor and the SMA; and
       a control module configured to cause the power supply to:
          transmit the electrical current to the heat source in response to receiving a first signal, thereby causing the heat source to heat the SMA via induction heating, wherein the SMA transforms from a first shape to a second shape when heated to above a predetermined temperature, and wherein the movable component actuates from the first position into the second position in response to the SMA transforming from the first shape into the second shape;
          cease transmitting the electrical current to the heat source in response to receiving a second signal, thereby causing the heat source to stop heating the SMA, wherein the second signal is received after the distance is measured to be less than or greater than a predetermined amount; and
          transmit the electrical current to the heat sink in response to receiving the second signal, thereby causing the heat sink to cool the SMA via magneto-thermal convection cooling, wherein the SMA transforms from the second shape back to the first shape when cooled to below the predetermined temperature, and wherein the movable component actuates from the second position into the first position in response to the SMA transforming from the second shape back into the first shape.

13. The mobile unit of claim 12, further comprising an adiabatic chamber, wherein the SMA, the heat source, and the heat sink are positioned within the adiabatic chamber.

14. The mobile unit of claim 13, wherein the heat source comprises a coil that is wrapped helically around the SMA.

15. The mobile unit of claim 14, wherein the movable component is selected from the group consisting of an aileron, a rudder, an elevator, a spoiler, a flap, and a slap, and wherein the mobile unit is an aircraft.

16. A method for actuating a movable component, comprising:
    supplying electrical current from a power supply to a heat source in response to receiving a first signal, thereby causing the heat source to heat a shape-memory alloy (SMA) via induction heating, wherein the SMA transforms from a first shape into a second shape when heated to above a predetermined temperature, and wherein the movable component actuates from a first position into a second position in response to the SMA transforming from the first shape into the second shape;
    measuring a distance between a sensor and the SMA using the sensor, wherein the sensor is coupled to or positioned proximate to the SMA; and
    supplying the electrical current to a heat sink in response to receiving a second signal after the distance is measured to be less than or greater than a predetermined amount, thereby causing the heat sink to cool the SMA via magneto-thermal convection cooling, wherein the SMA transforms from the second shape back into the first shape when cooled to below the predetermined temperature, and wherein the movable component actuates from the second position into the first position in response to the SMA transforming from the second shape back into the first shape.

17. The method of claim 16, further comprising ceasing to transmit the electrical current to the heat source in response to receiving the second signal, thereby causing the heat source to stop heating the SMA.

18. The method of claim 17, further comprising:
    measuring a temperature of the SMA after the first signal but before the second signal; and
    displaying the temperature when the temperature becomes greater than the predetermined temperature.

19. The method of claim 18, wherein the second signal is received in response to displaying the temperature.

20. The method of claim 19, wherein the heat source comprises a coil that is wrapped helically around the SMA.

* * * * *